United States Patent [19]

Marritt et al.

[11] Patent Number: 5,932,631
[45] Date of Patent: Aug. 3, 1999

[54] INK COMPOSITION HAVING EXCELLENT WATERFASTNESS

[75] Inventors: William Alan Marritt; Hiroshi Itoh, both of Suwa, Japan

[73] Assignee: Seiko Epson Corporation, Tokyo-to, Japan

[21] Appl. No.: 08/733,477

[22] Filed: Oct. 18, 1996

[30] Foreign Application Priority Data

Oct. 18, 1995 [JP] Japan ..................................... 7-270141
May 24, 1996 [JP] Japan ..................................... 8-130434

[51] Int. Cl.$^6$ ...................................................... C09D 5/00
[52] U.S. Cl. .................. 523/161; 106/31.13; 106/31.27; 106/31.32; 106/31.64
[58] Field of Search ............................. 106/31.13, 31.27, 106/31.32, 31.64; 523/161

[56] References Cited

U.S. PATENT DOCUMENTS 4,680,332  7/1987  Hair et al. ................. 524/377
5,631,309  5/1997  Yanagi et al. ............. 523/160

FOREIGN PATENT DOCUMENTS 0044378   1/1982  European Pat. Off. .
0550891   7/1993  European Pat. Off. .
07242846  9/1995  Japan .
2053948   2/1981  United Kingdom .

OTHER PUBLICATIONS

Patent Abstracts of Japan of JP 06058347 Dated Mar. 1994.

Patent Abstracts of Japan of JP 62280513 Dated Nov. 6, 1987.

Patent Abstracts of Japan of JP 04076280 Dated Feb. 22, 1992.

Primary Examiner—Edward J. Cain
Attorney, Agent, or Firm—Ladas & Parry

[57] ABSTRACT

An aqueous solution ink composition is provided which yields a waterfast printed image, is fast drying, and is stable under typical printing conditions in an ink-jet printer. The ink composition is excellent with regard to its stability and the waterfastness of the printed image. The aqueous solution ink composition comprises an alkali-soluble polymer resin, a basic dye or an oil-soluble salt-type dye with the color imparting portion of the salt being cationic, and an alkali in an amount sufficient to completely dissolve both the alkali-soluble polymer resin and the dye.

15 Claims, No Drawings

INK COMPOSITION HAVING EXCELLENT WATERFASTNESS

BACKGROUND OF THE INVENTION

1. Field of the Invention

This invention relates to an ink composition suitable for use in ink-jet printing, and more specifically to an ink composition which, when used in ink-jet printing, has excellent ejection stability under printing conditions and yields a waterfast printed image.

2. Background Art

At the present time, there are several different methods of ink-jet printing, by which a microscopic drop of ink is ejected from a nozzle such that the drop is transported and deposited onto recording media, such as paper. The following are given as examples of methods which can be used for ink-jet printing: static electricity-driven ejection, air pressure-driven ejection, piezoelectric device deformation-driven ejection, and thermal bubble formation-driven ejection.

Conventional inks which are printed using the above methods are well known in the art and include solutions of water-soluble dyes or dispersions of relatively water-insoluble pigments in water or aqueous solutions containing water-soluble organic solvents. The desired qualities for inks to be used in an ink-jet recording system typically include 1) high print quality irrespective of the type of recording media; 2) waterfastness of the printed ink irrespective of the type of recording media; 3) durability of the printed ink with respect to mild abrasion of the printed surface; 4) fast drying of the printed image such that continuously printed pages can be stacked without smearing of the printed images; 5) stability of the ink with respect to temperature extremes; 6) stability of the ink under actual printing conditions such that the nozzles of the print head do not become clogged; 7) the ability of the ink, which has lost solvent(s) as a result of evaporation (dried out), to be redissolved or redispersed when exposed to the ink which has been stored unchanged. This last quality 7) is important in cases in which the ink-jet printer is not used for an extended period of time and the print head must be cleaned by pulsing the head with unchanged ink which is stored in a reservoir, from which evaporation of the solvent components is minimized. The relative importance of the above qualities will depend, of course, on the specific printing application.

It should be noted that, in general for conventional inks, some of the above qualities are not fully compatible with some of the other qualities. For example, conventional inks which are composed of dispersions of relatively insoluble pigments in water or aqueous solutions containing water-soluble organic solvents can be formulated to give extremely high print quality and excellent waterfastness of the printed ink, irrespective of the type of recording media. The waterfastness of such inks is attributed to the inherent waterfastness of the colored pigments. However, because the pigments are dispersed instead of being dissolved in water or aqueous solutions containing water-soluble organic solvents, conventional inks of this type are usually not completely stable with respect to either temperature extremes or to actual printing conditions. Furthermore, in general, it is extremely difficult to formulate inks of this type such that the pigments can be redispersed when dried out ink, for example, in the head, is exposed to the ink which has been stored unchanged, for example, in the head.

As a contrasting example, conventional inks which are composed of water-soluble dyes in water or aqueous solutions containing water-soluble organic solvents can be formulated which yield fast drying printed images and excellent stability against temperature extremes and under actual printing conditions. Because the dyes are water soluble, it is relatively easy to formulate inks of this type in which the dyes can be redissolved when dried out ink is exposed to the ink which has been stored unchanged. However, because the dyes are water soluble, waterfast printed images cannot be obtained on all types of recording media.

As a means of circumventing the above problems with conventional inks which are composed of dispersions of relatively insoluble pigments in water or aqueous solutions containing water-soluble organic solvents, alkali-soluble polymer resins have been used in such ink compositions. Japan Laid-Open publication No.53-114985 discloses the ink composition in which a polymer resin which contains phenolic functionalities is used to form an emulsion with water insoluble pigments or dispersed dyes. The claimed advantage of this ink composition is to yield greater color development than inks which do not contain the polymer resin. The particle size of the polymer-stabilized water-insoluble pigments or dispersed dyes is stated to be less than 3 $\mu$m.

Japan Laid-Open Publication No.62-11782 discloses the ink composition in which a polyester resin which contains sulfonic acid functionalities is used to form an emulsion with water insoluble solvent dyes or dispersed dyes. The claimed principal advantage of this ink composition is that the ink composition can yield better waterfastness than inks which do not contain the polyester resin. Information about the particle size of the polymer-stabilized water-insoluble dyes or dispersed dyes is not included in the specification.

Japanese Patent Laid-Open Publication No. 2-248475 discloses the ink composition in which a polymer resin which contains carboxylic acid functionalities is used to form an emulsion with a polymer dispersion which contains either water soluble dyes or water insoluble pigments. The claimed advantage of using that particular alkali soluble polymeric resin is to impart better waterfastness and light-fastness than that of inks which do not contain the polymer. It is claimed in the specification that an alkali-soluble polymer resin containing ink composition is stable for three months at 50° C.

All three of the above examples offer improvements with respect to conventional inks which are composed of dispersions of relatively insoluble pigments in water or aqueous solutions containing water. However, because the pigments or dye containing polymer particles are dispersed instead of being dissolved in water or aqueous solutions containing water soluble organic solvents, such inks are not completely stable against temperature extremes or under actual printing conditions. Settling of the particles over a period of time occurs. Therefore, for these inks, there is still room for improvement. Furthermore, inks of this type cannot be easily redispersed when the ink is dried out and then re-exposed to the ink which has been stored unchanged.

As a means of circumventing some of the problems with conventional inks composed of water or aqueous solutions containing water-soluble organic solvents and water-soluble dyes, ink compositions using alkali-soluble polymer resins have been proposed. Japanese Patent Publication No.40-6581 discloses an ink composition comprising a polymer resin having carboxylic acid functionalities and a water-soluble basic dye. The claimed advantage of this ink composition is that the ink composition can yield an image having better waterfastness than inks which do not contain the polymer resin.

Japanese Patent Laid-Open Publication No. 62-64875 (Japanese Patent Publication No. 5-62633) discloses an ink composition comprising a polymer resin having sulfonic acid functionalities and a water-soluble basic dye. The claimed principal advantage of using that particular alkali soluble polymeric resin is to impart better waterfastness than that of inks which do not contain the polymer.

Japanese Patent Laid-Open No. 5-230413 discloses an ink composition comprising a styrenic polymer resin having carboxylic acid functionalities and a water-soluble basic dye. The average molecular weight of the polymer is in the range of 1500 to 30000 and the acid value of the polymer is in the range of 150 to 300. The claimed principal advantage of using that particular alkali soluble polymeric resin is to impart better waterfastness than that of inks which do not contain the polymer.

The alkali-soluble polymers used in those three examples appear to contribute greatly to the waterfastness of the resulting inks. However, because the dyes are water-soluble basic dyes, the printed images obtained from such inks will not be completely waterfast on all types of recording media. The inherent water solubility of the basic dyes will result in some dissolution of the dye when the printed image is exposed to an excess of water. Therefore, for the above ink composition, there is still room for improvement.

SUMMARY OF THE INVENTION

It is an object of the present invention to provide an ink composition, capable of yielding a waterfast printed image on paper irrespective of the type of paper, which is suitable for use especially in ink-jet recording.

It is another object of the present invention to provide an ink composition which can yield a fast drying printed image.

It is a further object of the present invention to provide an ink composition which can be ejected as ink droplets without clogging the nozzles of the print head and without trajectories non-perpendicular to the print head.

It is a further object of the present invention to provide an ink composition that, if solvents are evaporated from the ink composition, the dried ink composition can be completely redissolved when exposed to the original ink composition.

According to the invention described herein, there is provided an ink composition comprising: water; an alkali-soluble polymer resin; a dye; and an alkali in an amount sufficient to completely dissolve both the alkali-soluble polymer resin and the dye in the ink composition, the dye being a basic dye or an oil-soluble salt-type dye with the color imparting portion of the salt being cationic, said alkali-soluble polymer resin containing phenolic functionalities when the dye is a basic dye.

DETAILED DESCRIPTION OF THE INVENTION

The ink composition of the present invention is suitable for use in an ink-jet recording system using any of the methods known in the art for ejecting the ink through small nozzles which are typically less than 50 microns in diameter. The ink composition of the present invention can also be used in a writing instrument such as a pen.

Alkali-Soluble Polymer Resin

The alkali-soluble polymer resin of the present invention is practically insoluble in water having a pH of 4 to 7. The term "practically insoluble" used herein is intended to mean that the solubility in water at 25° C. is preferably less than 0.1 g/l. It is further necessary that when a certain amount of alkali is added to a mixture of the alkali-soluble polymer resin and water, the alkali-soluble polymer resin dissolves.

Specific examples of alkali-soluble polymer resins usable herein include resins containing sulfonic acid functionalities (hereinafter also referred to sulfonic acid containing resins), resins containing carboxylic acid functionalities (hereinafter also referred to carboxylic acid containing resins), and resins containing phenolic functionalities (hereinafter also referred to phenolic resins). In the present invention, a phenolic resin is used as the alkali-soluble resin when the dye is a basic dye.

The alkali-soluble polymer resin, which can be classified as a sulfonic acid containing resin, may include, for example, sulfonated polystyrene and sulfonated styrene-maleic anhydride copolymers. Several different grades of the former type of polymer resin are commercially available under the tradename VERSA-TL from National Starch and Chemical (10 Finderne Ave.; Bridgewater, N.J. 08807; USA). Several different grades of the latter type of polymer resin are commercially available under the tradename NATROL from National Starch and Chemical.

The alkali-soluble polymeric resin, which can be classified as a carboxylic acid containing resin, may include, for example, a styrene-acrylic acid resin, a styrene-maleic acid resin, a partially esterified styrene-maleic acid resin, and an isobutylene-maleic acid resin. Several grades of a styrene-acrylic acid are commercially available from SC Johnson Polymer (1525 Howe St.; Racine, Wis. 53403; USA). The resin is sold under the tradename JONCRYL. Several grades of a styrene-maleic acid resin are commercially available from Monsanto Co. (800 N. Lindbergh Blvd.; St. Louis, Mo. 63167; USA). The resin is sold under the tradename SCRIPSET. Several grades of partially esterified styrene-maleic acid resin are commercially available from Aldrich Japan (Chiyoda-ku; Tokyo, Japan). Specific examples thereof include poly(styrene-co-maleic acid), partial 2-butoxyethyl ester (Catalog number: 41,637-1), poly (styrene-co-maleic acid), partial cyclohexyl/isopropyl ester (Catalog number: 41,637-3), poly(styrene-co-maleic acid), partial isooctyl ester (Catalog number: 41,637-7), and poly (styrene-co-maleic acid), partial propyl ester (Catalog number: 41,637-5). Several grades of an isobutylene-maleic acid resin are commercially available from Kuraray Co.,Ltd. (Kashima-gun, Ibaraki, Japan). The resin is sold under the tradename ISOBAN.

The alkali-soluble polymer resin, which can be classified as a phenolic resin, is commercially available in several grades from Arakawa Chemical (Chuo-ku, Osaka, Japan). The resin is sold under the tradename TAMANORU. Further, it is commercially available in several grades from Sumitomo Durez under the tradename DUREZ.

Dye

The oil-soluble salt-type dyes of the present invention, with the color imparting portion of the salt being cationic, are insoluble or practically insoluble in water. The term "practically insoluble" is intended to mean that the solubility in water at 25° C. is preferably not more than 0.1 g/l. The term "oil-soluble salt-type dyes" generally refers to dyes which are soluble to some degree in organic solvents such as toluene, ethanol, acetone, ethyl acetate, and tetrahydrofuran, have an ionizable color imparting portion, and are in the form of a salt with a counter ion. Typical solubilities of oil-soluble dyes in solvents of this type are greater than or equal to approximately 0.2 g/l at 25° C. One example of an oil-soluble salt-type dye is Diaresin Yellow L3G which belongs to the class of monomethine compounds. The solubility of this oil soluble salt-type dye in the above listed organic solvents at 25° C. is as follows: toluene, 1.0 g/l; ethanol 9.6 g/l; acetone 23.5 g/l; ethyl acetate 14.0 g/l; and tetrahydrofuran, 67.5 g/l. The solubility of Diaresin Yellow L3G in water at 25° C. is less than 0.1 g/l.

Dyes which are oil soluble, but not salt type dyes, when used in the present invention, exhibit no satisfactory stability. The dyes which are oil soluble, but not salt type dyes, do not yield an aqueous solution ink when used with the alkali-soluble polymer resins and alkali of the present invention. Therefore, they are outside the scope of the present invention.

The oil-soluble salt-type dyes of the present invention can be distinguished from oil soluble but not salt-type dyes using conductiometric methods. Using a salt bridge, the conductivity of the oil soluble dye can be measured in non-aqueous solvents such as acetonitrile or N,N-dimethylformamide for which extensive bodies of experimental data exist. An oil soluble, but not salt type, dye will show little or no conductivity and will yield a conductivity value which is indicative of a non-electrolyte. An oil-soluble salt-type dyes will show significant conductivity and will yield a value indicative of the type of electrolyte, for example: 1:1, 1:2; 1:3, or 2:2. Most of the oil-soluble salt-type dyes which are commercially available are 1:1 electrolytes.

The oil-soluble salt-type dyes of the present invention are further specified such that the color imparting portion of the salt is cationic. Many dyes which are oil-soluble salt-type dyes, but with the color imparting portion of the salt being anionic, when used with the alkali soluble polymeric resins and alkali of the present invention, cannot offer a printed image having satisfactory waterfastness.

The oil-soluble salt-type dyes, with the color imparting portion of the salt being cationic, of the present invention can be distinguished from oil-soluble salt-type dyes, with the color imparting portion of the dye being anionic, using electrophoretic methods. Using a simple electrophoresis unit with the oil-soluble salt-type dye loaded onto a polyacrylamide gel, it is a simple matter to distinguish the charge of the color imparting portion. When the color imparting portion of the dye is cationic, the colored portion of the dye will migrate toward the negatively charged electrode. Similarly, when the color imparting portion of the dye is anionic, the colored portion of the dye will migrate towards the positively charged electrode.

Oil-soluble salt-type dyes exist in which both cationic and anionic color imparting portions are contained in a single dye. Such dyes, when used with the alkali-soluble resin and the alkali in the present invention, cannot offer a printed image having satisfactory waterfastness.

The oil-soluble salt-type dyes, with the color imparting portion of the salt being cationic, of the present invention may include, for example, Aizen Spilon Yellow C-GNH (tradename, manufactured by Hodogaya Chemical Co., Ltd.), Aizen Spilon Yellow C-2GH (tradename, manufactured by Hodogaya Chemical Co., Ltd.), Aizen Spilon Red C-GH (tradename, manufactured by Hodogaya Chemical Co., Ltd.), Aizen Spilon Red C-BH (tradename, manufactured by Hodogaya Chemical Co., Ltd.), Aizen Spilon Blue C-RH (tradename, manufactured by Hodogaya Chemical Co., Ltd.), Aizen Spilon Violet C-RH (tradename, manufactured by Hodogaya Chemical Co., Ltd.), Oplas Yellow 140 (tradename, manufactured by Orient Chemical Industries, Ltd.), Alcohol Blue B-10 (tradename, manufactured by Chuo Synthetic Chemical Co.,Ltd.), Alcohol Pink P-30 (tradename, manufactured by Chuo Synthetic Chemical Co.,Ltd.), Alcohol Yellow Y-10 (tradename, manufactured by Chuo Synthetic Chemical Co.,Ltd.), and Diaresin Yellow L3G (tradename manufactured by Mitsubishi Kasei Corp.).

Other dyes which are not yet commercially available, but which are oil-soluble salt-type dyes with the color imparting portion of the salt being cationic can be envisioned. For ink-jet printers, a cyan colored dye with a peak absorption around 675 nm is desirable. Oil-soluble copper phthalocyanine dyes are commercially available which have peak absorptions around 675 nm. An oil-soluble salt-type analog prepared by chemically modifying such an oil-soluble copper phthalocyanine dyes without a change in peak adsorption may also be used. One conceivable modification would be to sulfonate the phthalocyanine ring system and then amidate the sulfonyl group(s) with an amine which contains a cationic functionality. Such a dye falls within the scope of this invention.

Basic dyes usable in the present invention include, for example, Aizen Auramine OW 100 (tradename, C.I. Basic Yellow 2, manufactured by Hodogaya Chemical Co., Ltd.), Aizen Cathilon Yellow 3GLH (tradename, C.I. Basic Yellow 11, manufactured by Hodogaya Chemical Co., Ltd.), Aizen Cathilon Brilliant Yellow 5GLH (tradename, C.I. Basic Yellow 13, manufactured by Hodogaya Chemical Co., Ltd.), Aizen Cathilon Yellow GLH (tradename, C.I. Basic Yellow 14, manufactured by Hodogaya Chemical Co., Ltd.), Aizen Cathilon Yellow 3RLH (tradename, C.I. Basic Yellow 36, manufactured by Hodogaya Chemical Co., Ltd.), Baycolor Golden Yellow GLE 200% (tradename, manufactured by Bayer), Baycolor Yellow 8GLS 200% (tradename, manufactured by Bayer), Baycolor Yellow 7GLL 200% (tradename, manufactured by Bayer), Aizen Cathilon Orange GLH (tradename, C.I. Basic Orange 2, manufactured by Hodogaya Chemical Co., Ltd.), Aizen Cathilon Orange RH (tradename, C.I. Basic Orange 22, manufactured by Hodogaya Chemical Co., Ltd.), Rhodamine 6G (catalog number: 25, 243-3, Basic Red 1, Aldrich Japan), Aizen Astra Phloxine FF Concentrated (tradename, C.I. Basic Red 12, manufactured by Hodogaya Chemical Co., Ltd.), Aizen Cathilon Pink FGH (tradename, C.I. Basic Red 13, manufactured by Hodogaya Chemical Co., Ltd.), Aizen Cathilon Brilliant Red 4GH (tradename, C.I. Basic Red 14, manufactured by Hodogaya Chemical Co., Ltd.), Aizen Cathilon Red GTL (tradename, C.I. Basic Red 18, manufactured by Hodogaya Chemical Co., Ltd.), Aizen Cathilon Brilliant Pink BH (tradename, C.I. Basic Red 36, manufactured by Hodogaya Chemical Co., Ltd.), Aizen Cathilon Brilliant Scarlet RH (tradename, C.I. Basic Red 37, manufactured by Hodogaya Chemical Co., Ltd.), Aizen Cathilon Red GLH (tradename, C.I. Basic Red 38, manufactured by Hodogaya Chemical Co., Ltd.), Aizen Cathilon Red BLH (tradename, C.I. Basic Red 39, manufactured by Hodogaya Chemical Co., Ltd.), Aizen Cathilon Bordeaux RLH (tradename, C.I. Basic Red 40, manufactured by Hodogaya Chemical Co., Ltd.), Baycolor Red 5BL 200% (tradename, manufactured by Bayer), Baycolor Red BBL 200% (tradename, manufactured by Bayer), Baycolor Red FBL 200% (tradename, manufactured by Bayer), Aizen Methyl Violet Pure Special (tradename, C.I. Basic Violet 1, manufactured by Hodogaya Chemical Co., Ltd.), Aizen Crystal Violet Extra Pure (tradename, C.I. Basic Violet 3, manufactured by Hodogaya Chemical Co., Ltd.), Aizen Cathilon Red 6BH (tradename, C.I. Basic Violet 7, manufactured by Hodogaya Chemical Co., Ltd.), Aizen Rhodamine BH (tradename, C.I. Basic Violet 10, manufactured by Hodogaya Chemical Co., Ltd.), Aizen Cathilon Brilliant Red 3BPH (tradename, C.I. Basic Violet 15, manufactured by Hodogaya Chemical Co., Ltd.), Aizen Cathilon Violet FRLH (tradename, C.I. Basic Violet 25, manufactured by Hodogaya Chemical Co., Ltd.), Aizen Cathilon Red 7BNH (tradename, C.I. Basic Violet 27, manufactured by Hodogaya Chemical Co., Ltd.), Aizen Cathilon Violet 3BLH (tradename, C.I. Basic Violet 28, manufactured by Hodogaya Chemical Co., Ltd.), Aizen Brilliant Basic Cyanine 6GH (tradename, C.I. Basic Blue 1, manufactured by Hodogaya Chemical Co., Ltd.), Aizen Basic Pure Blue 5GH (tradename, C.I. Basic Blue 3, manufactured by Hodogaya Chemical Co., Ltd.), Aizen Victoria Pure Blue BOH (tradename, C.I. Basic Blue 7, manufactured by Hodogaya Chemical Co., Ltd.), Aizen Methylene Blue FZ (tradename, C.I. Basic Blue 9, manufactured by Hodogaya Chemical Co., Ltd.), Aizen Methylene Blue BH Concentrated (tradename, C.I. Basic Blue 9, manufactured by Hodogaya Chemical Co., Ltd.), Aizen Victoria Blue BH (tradename, C.I. Basic Blue 26, manufactured by Hodogaya Chemical Co., Ltd.), Aizen Marine Blue BNX (tradename, C.I. Basic Blue 28, manufactured by Hodogaya Chemical Co., Ltd.), Aizen Cathilon Blue 5GLH (tradename, C.I. Basic Blue 45, manufactured by Hodogaya Chemical Co., Ltd.), Aizen Cathilon Blue 3RLH (tradename, C.I. Basic Blue 47, manufactured by Hodogaya Chemical Co., Ltd.), Aizen Cathilon Navy Blue GLH (tradename, C.I. Basic Blue 64, manufactured by Hodogaya Chemical Co., Ltd.), Aizen Cathilon Blue GLH (tradename, C.I. Basic Blue 65, manufactured by Hodogaya Chemical Co., Ltd.), Aizen Cathilon Blue NBLH (tradename, C.I. Basic Blue 66, manufactured by Hodogaya Chemical Co., Ltd.), Aizen Cathilon Blue NRLH (tradename, C.I. Basic Blue 67, manufactured by Hodogaya Chemical Co., Ltd.), Aizen Cathilon Blue 2RLH (tradename, C.I. Basic Blue 68, manufactured by Hodogaya Chemical Co., Ltd.), Baycolor Blue 5GL 200% (tradename, manufactured by Bayer), Baycolor Blue F2RL 200% (tradename, manufactured by Bayer), Baycolor Blue BG 200% (tradename, manufactured by Bayer), Aizen Diamond Green GH (tradename, C.I. Basic Green 1, manufactured by Hodogaya Chemical Co., Ltd.), Aizen Malachite Green (tradename, C.I. Basic Green 4, manufactured by Hodogaya Chemical Co., Ltd.), Aizen Cathilon Brown 3GLH (tradename, C.I. Basic Brown 11, manufactured by Hodogaya Chemical Co., Ltd.), and Aizen Cathilon Red Brown 2GLH (tradename, C.I. Basic Brown 11, manufactured by Hodogaya Chemical Co., Ltd.).

Alkali

The alkali used in the present invention is not particularly limited so far as it, when present in the ink composition, can dissolve the alkali-soluble resin and the dye.

Preferred alkali usable in the present invention include inorganic bases, water-soluble organic bases, and slightly water-soluble organic bases.

Inorganic bases usable herein include NaOH, KOH, LiOH, CsOH, sodium metasilicate, disodium hydrogen phosphate, trisodium phosphate, sodium bicarbonate, sodium carbonate, and ammonia.

Examples of water-soluble organic bases include methylamine, dimethylamine, trimethyamine, ethylamine, diethylamine, triethylamine, ethanolamine, diethanolamine, triethanolamine, N-methyl-ethanolamine, N,N-dimethylethanolamine, N-methyl-diethanolamine, dipropylamine, dibutylamine, tripropanolamine, tris(hydroxymethyl)aminomethane, ethylenediamine, N,N'-dimethylethylenediamine, N,N,N',N'-tetramethylethylenediamine, tetramethylammonium hydroxide, tetraethylammonium hydroxide, tetrapropylammonium hydroxide, and tetrabutylammonium hydroxide.

Slightly water-soluble organic bases usable herein include tripropylamine, tributylamine, trihexylamine, diisopropylethylamine, dicyclohexylamine, and dihexylamine.

The choice of the alkali depends on the type of alkali-soluble polymer resin, the type of oil-soluble salt-type dye, the concentration and type of optional additives such as a water-soluble monoalkyl ether of an alkylene glycol or polyalkylene glycol, and on the degree of waterfastness which is desired. Bases having relatively low basicity are preferably used when sulfonic acid containing resins and carboxylic acid containing resins are used. For example, the use of organic amines which are volatile at room temperature is preferred. When phenolic resins are used, bases having relatively high basicity are preferably used. For example, inorganic bases such as sodium hydroxide are preferred.

Even when exactly the same resin is employed, the use of different bases depending on the type of dye used is often required. For example, in the case of a 2:1 mixture of styrene-acrylic acid (JONCRYL 682) and Aizen Spilon Red C-BH, the use of tris(hydroxymethyl)aminomethane is preferred. On the other hand, in the case of a 2:1 mixture of a styrene-acrylic acid (JONCRYL 682) and Diaresin Yellow L3G, the use of bases having higher basicity, such as triethylamine and NaOH, is preferred.

It may be desirable in certain cases to use both a non-volatile alkali and a volatile alkali. The non-volatile alkali is used to maintain the ink at a certain pH for an extended period of time such that an acceptable shelf life is obtained. The volatile alkali is used to obtain good waterfastness of the printed image.

Ink Composition

Without intending to be bound by the following theory, the reason why the ink composition of the present invention is stable and can yield a waterfast printed image is believed to be as follows.

In the ink composition of the present invention, the dye is ionically banded to the alkali-soluble resin by mutual attraction of their opposite charges. This enables the colorant component to be stably present in the ink composition. On the other hand, the waterfastness is believed to be realized on a recording medium for the following two reasons. The first reason is that the pH of water used in everyday life is generally on the acid side. Specifically, deposition of water in everyday life on the ink printed on a recording medium results in a neutralization reaction of the water with the base contained in the ink. Thus, the deposited water does not have a basicity high enough to redissolve the resin or the dye ionically bonded to the resin in the printed ink. The second reason is that the amount of the water deposited is much larger than that of the ink printed on the recording medium. Specifically, the base, from the ink, is dissolved in and diluted with a large amount the deposited water. Thus, the deposited water exhibits only a low basicity which is insufficient to dissolve the resin or the dye ionically bonded to the resin in the printed ink. Both the above two reasons, rather than any one of them, are considered to contribute to the development of waterfastness of the printed image.

The amount of the alkali-soluble polymer resin used in the ink composition may be suitably determined by taking into consideration the type of the polymer, the molecular weight of the polymer, and the other ink components (dye, alkali, and optional additives such as a water-soluble monoalkyl ether of an alkylene glycol or a polyalkylene glycol), so far as the object of the present invention can be attained. In general, however, the amount of the polymer used will be in the range of 1 to 15% by weight. With the above range, the dye in an amount large enough to yield printed images with acceptable density can be solubilized, with the ink composition having an acceptably low viscosity. For use in ink-jet recording, the amount of the alkali-soluble polymer is preferably determined so that the viscosity of the ink composition is not more than 10 cps at 20° C.

The oil-soluble salt-type dyes of the present invention are specified to be present in an amount of preferably 0.05 to 3 parts by weight, more preferably 0.2 to 1.2 parts by weight, based on one part by weight of the alkali-soluble polymer resin. The basic dye is specified to be present in an amount of preferably 0.05 to 3 parts by weight, more preferably 0.2 to 1.2 parts by weight, based on one part by weight of the alkali-soluble resin having phenolic functionalities.

The amount of the alkali used in the ink is not particularly limited so far as it is large enough to completely dissolve the alkali-soluble polymer and the dye. However, an amount of alkali just slightly in excess of the minimum amount of that required to just solubilize the polymer and dye is preferred. For the purpose of obtaining greater ink stability, an amount of alkali 10% or more in excess of the minimum amount of that required to just solubilize the polymer and dye is preferred.

The minimum amount of alkali that is required to just solubilize the alkali soluble polymeric resin and the dye is slightly affected by the amount of an optional additive, such as a water-soluble monoalkyl ether of an alkylene glycol or a polyalkylene glycol. Accordingly, in some cases in which an optional additive is used, it may be advantageous, but not required, to add the additive before addition of the alkali.

A water-soluble monoalkyl ether of an alkylene glycol or a polyalkylene glycol may be added to ink compositions of the present invention in order to facilitate fast drying of printed images. The addition thereof results in improved fast drying of the printed images. In some polymer and dye combinations, it may be possible to obtain sufficiently fast drying of the printed images without the addition of a water-soluble monoalkyl ether of an alkylene glycol or a polyalkylene glycol.

The water-soluble monoalkyl ether of an alkylene glycol or a polyalkylene glycol usable herein may include, for example, ethylene glycol monomethyl ether, ethylene glycol monoethyl ether, ethylene glycol mono-n-propyl ether, ethylene glycol mono-i-propyl ether, ethylene glycol mono-n-butyl ether, ethylene glycol mono-s-butyl ether, diethylene glycol monomethyl ether, diethylene glycol monoethyl ether, diethylene glycol mono-n-propyl ether, diethylene glycol mono-i-propyl ether, diethylene glycol mono-n-butyl ether, diethylene glycol mono-s-butyl ether, triethylene glycol monomethyl ether, triethylene glycol monoethyl ether, triethylene glycol mono-n-propyl ether, triethylene glycol mono-i-propyl ether, triethylene glycol mono-n-butyl ether, triethylene glycol mono-s-butyl ether, propylene glycol monomethyl ether, and propylene glycol monoethyl ether. The amount of the water-soluble monoalkyl ether of an alkylene glycol or a polyalkylene glycol is preferably in the range of 1 to 40%, more preferably in the range of 5 to 30%.

In addition to the above components, the ink composition of the present invention may further contain a humectant such as glycerol, antifungal agents, surfactants, and other water-soluble resins which may be used to adjust the viscosity of the ink.

The ink composition of the present invention may be prepared preferably by first preparing a homogeneous mixture of the dye with the alkali-soluble polymer resin and then dissolving the homogeneous mixture in water containing a satisfactory amount of an alkali. If an optional additive such as a water-soluble monoalkyl ether of an alkylene glycol or a polyalkylene glycol is added to the mixture before dissolution of the homogeneous mixture of dye and polymer, the dissolution is, in general, favorably accelerated.

A homogeneous mixture of the dye and the alkali-soluble polymer resin can be prepared by many conceivable methods. One very useful method is to blend the dye with the polymer at elevated temperature and at high shear rates. A preferred temperature range is one that is above the softening point of the alkali soluble polymer resin and below the decomposition temperature of the dye. High shear rates may be applied using mixing equipment designed for extrusion molding of plastics. Another preferred method is to dissolve both the polymer and dye in a mutually compatible volatile solvent and then spray dry the solution. A further method is to swell the polymer with a solvent in which the dye is soluble and in which the polymer is insoluble, but swellable. Elevated temperature and pressure can be used to increase the rate at which the dye impregnates the swollen polymer.

Alternatively, the ink composition of the present invention may be prepared by dissolving the alkali-soluble resin in water in the presence of the alkali and adding and dissolving the oil-soluble dye in the solution.

EXAMPLES

The present invention will be further clarified by the following specific examples.

Example A1

2.5 g of Aizen Spilon Violet C-RH (tradename, manufactured by Hodogaya Chemical Co., Ltd.) was mixed with 5 g of the phenolic resin TAMANORU PA (tradename, manufactured by Arakawa Chemical Industries, Ltd.) in a stainless steel beaker. While heating the mixture at 180° C. for 10 minutes, the mixture was vigorously mixed using a stainless steel spatula. After heating and mixing, a homogeneous translucent glassy mixture was obtained. After cooling to room temperature, the glassy resin-dye material was broken into small pieces and transferred to a 100 ml sample bottle. 3.25 g of 40% aqueous NaOH solution and 79.25 g of ultrapure water were also transferred to the sample bottle. The mixture was stirred at room temperature for six hours during which time the glassy resin-dye material dissolved. 10 g of ethylene glycol mono-n-butyl ether was added and the mixture stirred for an additional 1 hour. The mixture was filtered through a 5 μm stainless steel mesh. This ink composition had a viscosity of 3.8 cps at 20° C. and a pH of 12.5.

Example A2

2.5 g of Aizen Spilon Blue C-RH (tradename, manufactured by Hodogaya Chemical Co., Ltd.) was mixed with 5 g of the phenolic resin TAMANORU PA (tradename, manufactured by Arakawa Chemical Industries, Ltd.) in a stainless steel beaker. The mixture was heated and mixed in the same manner as in Example A1 to obtain a homogeneous translucent glassy mixture. The glassy resin-dye material was dissolved in 79.25 g of ultrapure water and 3.25 g of 40% aqueous NaOH solution in the same manner as in Example A1. 10 g of diethylene glycol monoethyl ether was added and the mixture stirred for an additional 1 hour. The mixture was filtered through a 5 μm stainless steel mesh. This ink composition had a viscosity of 3.7 cps at 20° C. and a pH of 12.5.

Example A3

2.5 g of Aizen Spilon Yellow C-GNH (tradename, manufactured by Hodogaya Chemical Co., Ltd.) was mixed with 5 g of the phenolic resin TAMANORU PA (tradename, manufactured by Arakawa Chemical Industries, Ltd.) in a stainless steel beaker. The mixture was heated at 200° C. and mixed in the same manner as in Example A1 to obtain a homogeneous translucent glassy mixture. The glassy resin-dye material was dissolved in 80.1 g of ultrapure water and 2.4 g of 40% aqueous NaOH solution in the same manner as in Example A1. 10 g of diethylene glycol monomethyl ether was added and the mixture stirred for an additional 1 hour. The mixture was filtered through a 5 μm stainless steel mesh. This ink composition had a viscosity of 3.7 cps at 20° C. and a pH of 12.3.

Example A4

2.5 g of Aizen Spilon Yellow C-2GH (tradename, manufactured by Hodogaya Chemical Co., Ltd.) was mixed with 5 g of the phenolic resin TAMANORU PA (tradename, manufactured by Arakawa Chemical Industries, Ltd.) in a stainless steel beaker. The mixture was heated at 200° C. and mixed in the same manner as in Example A1 to obtain a homogeneous translucent glassy mixture. The glassy resin-dye material was dissolved in 80.1 g of ultrapure water and 2.4 g of 40% aqueous NaOH solution in the same manner as in Example A1. 10 g of triethylene glycol mono-n-butyl ether was added and the mixture stirred for an additional 1 hour. The mixture was filtered through a 5 μm stainless steel mesh. This ink composition had a viscosity of 4.1 cps at 20° C. and a pH of 12.4.

Example A5

2.5 g of Oplas Yellow 140 (tradename, manufactured by Orient Chemical Industries, Ltd.) was mixed with 5 g of the phenolic resin TAMANORU PA (tradename, manufactured by Arakawa Chemical Industries, Ltd.) in a stainless steel beaker. The mixture was heated at 160° C. and mixed in the same manner as in Example A1 to obtain a homogeneous translucent glassy mixture. The glassy resin-dye material was dissolved in 80.5 g of ultrapure water and 2 g of 40% aqueous NaOH solution in the same manner as in Example A1. 10 g of diethylene glycol mono-n-butyl ether was added and the mixture stirred for an additional 1 hour. The mixture was filtered through a 5 μm stainless steel mesh. This ink composition had a viscosity of 3.5 cps at 20° C. and a pH of 10.9.

Example A6

2.5 g of Aizen Spilon Red C-BH (tradename, manufactured by Hodogaya Chemical Co., Ltd.) was mixed with 5 g of the phenolic resin TAMANORU PA (tradename, manufactured by Arakawa Chemical Industries, Ltd.) in a stainless steel beaker. The mixture was heated and mixed in the same manner as in Example A1 to obtain a homogeneous translucent glassy mixture. The glassy resin-dye material was dissolved in 78.75 g of ultrapure water and 3.75 g of 40% aqueous NaOH solution in the same manner as in Example A1. 10 g of diethylene glycol mono-n-butyl ether was added and the mixture stirred for an additional 1 hour. The mixture was filtered through a 5 μm stainless steel mesh. This ink composition had a viscosity of 4.2 cps at 20° C. and a pH of 12.8.

Example A7

2.5 g of Alcohol Blue B-10 (tradename, manufactured by Chuo Synthetic Chemical CO., Ltd.) was mixed with 5 g of the phenolic resin TAMANORU PA (tradename, manufactured by Arakawa Chemical Industries, Ltd.) in a stainless steel beaker. The mixture was heated and mixed in the same manner as in Example A1 to obtain a homogeneous translucent glassy mixture. The glassy resin-dye material was dissolved in 79.25 g of ultrapure water and 2.35 g of 40% aqueous NaOH solution in the same manner as in Example A1. 10.9 g of diethylene glycol mono-n-butyl ether was added and the mixture stirred for an additional 1 hour. The mixture was filtered through a 5 μm stainless steel mesh. This ink composition had a viscosity of 3.7 cps at 20° C. and a pH of 11.5.

Example A8

3.0 g of Alcohol Blue B-10 (tradename, manufactured by Chuo Synthetic Chemical Co., Ltd.) was mixed with 7.5 g of the styrene-acrylic acid resin JONCRYL 682 (tradename, manufactured by SC Jhonson Polymer) in a stainless steel beaker. The mixture was heated and mixed in the same manner as in Example A1 to obtain a homogeneous translucent glassy mixture. The glassy resin-dye material was dissolved in 76 g of ultrapure water and 3.5 g of triethylamine in the same manner as in Example A1. 10 g of diethylene glycol monoethyl ether was added and the mixture stirred for an additional 1 hour. The mixture was filtered through a 5 μm stainless steel mesh. This ink composition had a viscosity of 4.3 cps at 20° C. and a pH of 8.9.

Example A9

3.0 g of Diaresin Yellow L3G (tradename, manufactured by Mitsubishi Kasei Corp.) was mixed with 7.5 g of the styrene-acrylic acid resin JONCRYL 682 (tradename, manufactured by SC Jhonson Polymer) in a stainless steel beaker. The mixture was heated and mixed in the same manner as in Example A1 to obtain a homogeneous translucent glassy mixture. The glassy resin-dye material was dissolved in 62.9 g of ultrapure water and 6.7 g of diisopropylethylamine in the same manner as in Example A1. 19.9 g of diethylene glycol mono-n-butyl ether was added and the mixture stirred for an additional 1 hour. The mixture was filtered through a 5 μm stainless steel mesh. This ink composition had a viscosity of 4.4 cps at 20° C. and a pH of 10.3.

Example A10

3.0 g of Aizen Spilon Red C-BH (tradename, manufactured by Hodogaya Chemical Co., Ltd.) was mixed with 7.5 g of the styrene-acrylic acid resin JONCRYL 682 (tradename, manufactured by SC Jhonson Polymer) in a stainless steel beaker. The mixture was heated and mixed in the same manner as in Example A1 to obtain a homogeneous translucent glassy mixture. The glassy resin-dye material was dissolved in 75.7 g of ultrapure water and 3.8 g of triethylamine in the same manner as in Example A1. 10 g of diethylene glycol mono-n-butyl ether was added and the mixture stirred for an additional 1 hour. The mixture was filtered through a 5 μm stainless steel mesh. This ink composition had a viscosity of 4.2 cps at 20° C. and a pH of 8.1.

Example A11

2.0 g of Aizen Spilon Violet C-RH (tradename, manufactured by Hodogaya Chemical Co., Ltd.) was mixed with 8.0 g of sulfonated polystyrene resin VERSA-TL (tradename, National Starch and Chemical) which had been washed with 0.1 N sulfuric acid, washed with water, and then dried under vacuum. The mixture of dye and resin and 80 g of ethanol was transferred to a 200 ml teflon-lined stainless steel digestion bomb. The digestion bomb was sealed and placed in an oven at 100° C. for 24 hours. After cooling to room temperature, the gel-like mixture was transferred to a 100 ml sample bottle. The mixture was warmed on a hot plate such that the ethanol was gradually evaporated over a period of several hours. Any residual ethanol was removed by further drying the sample bottle and its contents in a dessicator under reduced pressure for 24 hours. 1.35 g of 30% aqueous trimethylamine solution and 76.65 g of ultrapure water were also transferred to the sample bottle. The mixture was stirred at room temperature for six hours during which time the solid material dissolved. 12 g of ethylene glycol monoethyl ether was added and the mixture stirred for an additional 1 hour. The mixture was filtered through a 5 μm stainless steel mesh. This ink composition had a viscosity of 4.5 cps at 20° C. and a pH of 7.3.

Example A12

3.0 g of Alcohol Yellow Y-10 (tradename, manufactured by Chuo Synthetic Chemical Co., Ltd.) was mixed with 8.0 g of sulfonated polystyrene resin VERSA-TL (tradename, National Starch and Chemical) which had been washed with 0.1 N sulfuric acid, washed with water, and then dried under vacuum. The mixture of dye and resin and 80 g of ethanol was transferred to a 200 ml teflon-lined stainless steel digestion bomb. The digestion bomb was sealed and placed in an oven at 100° C. for 24 hours. After cooling to room temperature, the gel-like mixture was transferred to a 100 ml sample bottle. The mixture was warmed on a hot plate such that the ethanol was gradually evaporated over a period of several hours. Any residual ethanol was removed by further drying the sample bottle and its contents in a dessicator under reduced pressure for 24 hours. 1.45 g of 30% aqueous trimethylamine solution and 77.55 g of ultrapure water were also transferred to the sample bottle. The mixture was stirred at room temperature for six hours during which time the solid material dissolved. 10 g of ethylene glycol mono-n-butyl ether was added and the mixture stirred for an additional 1 hour. The mixture was filtered through a 5 μm stainless steel mesh. This ink composition had a viscosity of 4.6 cps at 20° C. and a pH of 7.2.

All of the inks prepared in Examples A1 to A12 were ultracentrifuged at 80,000 rpm for two hours. No separated solids were observed for any of the samples. These results were interpreted to mean that all of the inks were aqueous solution inks with all the ingredients constituting the inks being in a dissolved state.

Comparative Example A1

A pigment-type ink containing the styrene-acrylic acid resin JONCRYL 62 (tradename, manufactured by SC Johnson Polymer) was prepared having a composition similar to that of the pigment-type ink described in Japanese Patent Laid-Open No. 5-230413. The pigment-type ink had the following composition: JONCRYL 62 (21%), Color Black SB-5 (7.1%, tradename, manufactured by Degussa), Neocol YSK (0.4%, tradename, manufactured by Dai-Ichi Kogyo Seiyaku Co., Ltd.), ethylene glycol (6.5%), and ultrapure water (65%). The mixture was blended for several hours to obtain a homogenous mixture.

Comparative Example A2

An ink containing a water-soluble basic dye and the styrene-acrylic acid resin JONCRYL 680 (tradename, manufactured by SC Johnson Polymer) was prepared having a composition similar to Example A8 of Japanese Patent Laid-Open No. 5-230413. C.I. Basic Red 12 (Aizen Astra Phloxine FF Conc., tradename, manufactured by Hodogaya Chemical Co., Ltd.) was used instead of C.I. Basic Blue 7. The water-soluble basic dye-containing ink had the following composition: C.I. Basic Red (2.5%), JONCRYL 680 (7.5%), 28% ammonia solution (0.87%), triethanolamine (2.13%), propylene glycol (15%), and ultrapure water (72%). This ink was prepared in the same manner as described in Example A8 of Japanese Patent Laid-Open No. 5-230413.

Example B1

2.5 g of Aizen Cathilon Brilliant Yellow 5GLH 200% (tradename, manufactured by Hodogaya Chemical Co., Ltd.) was mixed with 5 g of the phenolic resin TAMANORU PA (tradename, manufactured by Arakawa Chemical Industries, Ltd.) in a stainless steel beaker. While heating the mixture at 180° C. for 10 minutes, the mixture was vigorously mixed using a stainless steel spatula. After heating and mixing, a homogeneous translucent glassy mixture was obtained. After cooling to room temperature, the glassy resin-dye material was broken into small pieces and transferred to a 100 ml sample bottle. 3.1 g of 40% aqueous NaOH solution and 79.4 g of ultrapure water were also transferred to the sample bottle. The mixture was stirred at room temperature for six hours during which time the glassy resin-dye material dissolved. 10 g of diethylene glycol monoethyl ether was added and the mixture stirred for an additional 1 hour. The mixture was filtered through a 5 μm stainless steel mesh. This ink composition had a viscosity of 3.8 cps at 20° C. and a pH of 12.3.

Example B2

2.5 g of Aizen Cathilon Yellow 7G-DP (tradename, manufactured by Hodogaya Chemical Co., Ltd.) was mixed with 5 g of the phenolic resin TAMANORU PA (tradename, manufactured by Arakawa Chemical Industries, Ltd.) in a stainless steel beaker. The mixture was heated and mixed in the same manner as in Example B1 to obtain a homogeneous translucent glassy mixture. The glassy resin-dye material was dissolved in 79.3 g of ultrapure water and 3.2 g of 40% aqueous NaOH solution in the same manner as in Example B1. 10 g of diethylene glycol monoethyl ether was added and the mixture stirred for an additional 1 hour. The mixture was filtered through a 5 μm stainless steel mesh. This ink composition had a viscosity of 3.9 cps at 20° C. and a pH of 12.7.

Example B3

2.5 g of Aizen Cathilon Brilliant Pink CD-BH Concentrated (tradename, manufactured by Hodogaya Chemical Co., Ltd.) was mixed with 5 g of the phenolic resin TAMANORU PA (tradename, manufactured by Arakawa Chemical Industries, Ltd.) in a stainless steel beaker. The mixture was heated at 190° C. and mixed in the same manner as in Example B1 to obtain a homogeneous translucent glassy mixture. The glassy resin-dye material was dissolved in 80 g of ultrapure water and 2.5 g of 40% aqueous NaOH solution in the same manner as in Example B1. 10 g of triethylene glycol mono-n-butyl ether was added and the mixture stirred for an additional 1 hour. The mixture was filtered through a 5 μm stainless steel mesh. This ink composition had a viscosity of 4.2 cps at 20° C. and a pH of 12.1.

Example B4

2.5 g of Aizen Astra Phloxine FF Concentrated (tradename, manufactured by Hodogaya Chemical Co., Ltd.) was mixed with 5 g of the phenolic resin TAMANORU PA (tradename, manufactured by Arakawa Chemical Industries, Ltd.) in a stainless steel beaker. The mixture was heated at 190° C. and mixed in the same manner as in Example B1 to obtain a homogeneous translucent glassy mixture. The glassy resin-dye material was dissolved in 80.1 g of ultrapure water and 2.4 g of 40% aqueous NaOH solution in the same manner as in Example B1. 10 g of diethylene glycol mono-n-butyl ether was added and the mixture stirred for an additional 1 hour. The mixture was filtered through a 5 μm stainless steel mesh. This ink composition had a viscosity of 4.0 cps at 20° C. and a pH of 12.2.

Example B5

2.5 g of Aizen Cathilon Red 7BH 200% (tradename, manufactured by Hodogaya Chemical Co., Ltd.) was mixed with 5 g of the phenolic resin TAMANORU PA (tradename, manufactured by Arakawa Chemical Industries, Ltd.) in a stainless steel beaker. The mixture was heated at 170° C. and mixed in the same manner as in Example B1 to obtain a homogeneous translucent glassy mixture. The glassy resin-dye material was dissolved in 79.7 g of ultrapure water and 2.8 g of 40% aqueous NaOH solution in the same manner as in Example B1. 10 g of diethylene glycol mono-n-butyl ether was added and the mixture stirred for an additional 1 hour. The mixture was filtered through a 5 μm stainless steel mesh. This ink composition had a viscosity of 3.5 cps at 20° C. and a pH of 12.6.

Example B6

2.5 g of Aizen Cathilon Blue 5G-DP (tradename, manufactured by Hodogaya Chemical Co., Ltd.) was mixed with 5 g of the phenolic resin TAMANORU PA (tradename, manufactured by Arakawa Chemical Industries, Ltd.) in a stainless steel beaker. The mixture was heated and mixed in the same manner as in Example B1 to obtain a homogeneous translucent glassy mixture. The glassy resin-dye material was dissolved in 79.9 g of ultrapure water and 2.6 g of 40% aqueous NaOH solution in the same manner as in Example B1. 10 g of diethylene glycol mono-n-butyl ether was added and the mixture stirred for an additional 1 hour. The mixture was filtered through a 5 μm stainless steel mesh. This ink composition had a viscosity of 4.2 cps at 20° C. and a pH of 12.1.

Example B7

2.5 g of Aizen Cathilon Pure Blue 5GH Concentrated (tradename, manufactured by Hodogaya Chemical Co., Ltd.) was mixed with 5 g of the phenolic resin TAMANORU PA (tradename, manufactured by Arakawa Chemical Industries, Ltd.) in a stainless steel beaker. The mixture was heated and mixed in the same manner as in Example B1 to obtain a homogeneous translucent glassy mixture. The glassy resin-dye material was dissolved in 79.6 g of ultrapure water and 2.9 g of 40% aqueous NaOH solution in the same manner as in Example B1. 10 g of diethylene glycol ethyl ether was added and the mixture stirred for an additional 1 hour. The mixture was filtered through a 5 μm stainless steel mesh. This ink composition had a viscosity of 3.9 cps at 20° C. and a pH of 12.8.

Example B8

2.5 g of Aizen Brilliant Basic Cyanine 6GH (tradename, manufactured by Hodogaya Chemical Co., Ltd.) was mixed with 5 g of the phenolic resin TAMANORU PA (tradename, manufactured by Arakawa Chemical Industries, Ltd.) in a stainless steel beaker. The mixture was heated and mixed in the same manner as in Example B1 to obtain a homogeneous translucent glassy mixture. The glassy resin-dye material was dissolved in 79.2 g of ultrapure water and 3.3 g of 40% aqueous NaOH solution in the same manner as in Example B1. 10 g of diethylene glycol mono-n-butyl ether was added and the mixture stirred for an additional 1 hour. The mixture was filtered through a 5 μm stainless steel mesh. This ink composition had a viscosity of 4.4 cps at 20° C. and a pH of 12.5.

Example B9

2.5 g of Aizen Cathilon Orange RH (tradename, manufactured by Hodogaya Chemical Co., Ltd.) was dissolved in 47.5 g of ultrapure water with stirring. 5 g of the phenolic resin TAMANORU PA (tradename, manufactured by Arakawa Chemical Industries, Ltd.) and 3.0 g of 40% aqueous NaOH solution were added to 32 g of ultrapure water, and the mixture was stirred for 2 hours. 10 g of ethylene glycol mono-n-butyl ether was added to the mixture with stirring, and stirring was continued for an additional one hour. The above colorant solution was added dropwise to the mixture with stirring. After the completion of the addition of the colorant solution, the mixture was further stirred for an additional four hours. It was then filtered through a 5 μm stainless steel mesh. This ink composition had a viscosity of 4.6 cps at 20° C. and a pH of 12.5.

Example 10

2.5 g of Aizen Cathilon Brilliant Scarlet RH (tradename, manufactured by Hodogaya Chemical Co., Ltd.) was dissolved in 47.5 g of ultrapure water with stirring. 5 g of the phenolic resin TAMANORU PA (tradename, manufactured by Arakawa Chemical Industries, Ltd.) and 3.1 g of 40% aqueous NaOH solution were added to 31.9 g of ultrapure water, and the mixture was stirred for 2 hours. 10 g of diethylene glycol mono-n-butyl ether was added to the mixture with stirring, and stirring was continued for an additional one hour. The above colorant solution was added dropwise to the mixture with stirring. After the completion of the addition of the colorant solution, the mixture was further stirred for an additional four hours. It was then filtered through a 5 μm stainless steel mesh. This ink composition had a viscosity of 4.1 cps at 20° C. and a pH of 12.8.

Example B11

2.5 g of Aizen Victoria Blue BH (tradename, manufactured by Hodogaya Chemical Co., Ltd.) was dissolved in 47.5 g of ultrapure water with stirring. 5 g of the phenolic resin TAMANORU PA (tradename, manufactured by Arakawa Chemical Industries, Ltd.) and 2.9 g of 40% aqueous NaOH solution were added to 32.1 g of ultrapure water, and the mixture was stirred for 2 hours. 10 g of diethylene glycol mono-n-butyl ether was added to the mixture with stirring, and stirring was continued for an additional one hour. The above colorant solution was added dropwise to the mixture with stirring. After the completion of the addition of the colorant solution, the mixture was further stirred for an additional four hours. It was then filtered through a 5 μm stainless steel mesh. This ink composition had a viscosity of 4.0 cps at 20° C. and a pH of 12.2.

Comparative Example B1

A pigment-type ink containing the styrene-acrylic acid resin JONCRYL 62 (tradename, manufactured by SC Johnson Polymer) was prepared having a composition similar to that of the pigment-type ink described in Japanese Patent Laid-Open No. 5-230413. The pigment-type ink had the following composition: JONCRYL 62 (21%), Color Black SB-5 (7.1%, tradename, manufactured by Degussa), Neocol YSK (0.4%, tradename, manufactured by Dai-Ichi Kogyo Seiyaku Co., Ltd.), ethylene glycol (6.5%), and ultrapure water (65%). The mixture was blended for several hours to obtain a homogenous mixture.

Comparative Example B2

An ink containing a water-soluble basic dye and the styrene-acrylic acid resin JONCRYL 680 (tradename, manufactured by SC Johnson Polymer) was prepared having a composition similar to Example B8 of Japanese Patent Laid-Open No. 5-230413. C.I. Basic Red 12 (Aizen Astra Phloxine FF Conc., tradename, manufactured by Hodogaya Chemical Co., Ltd.) was used instead of C.I. Basic Blue 7. The water-soluble basic dye-containing ink had the following composition: C.I. Basic Red 12 (2.5%), JONCRYL 680 (7.5%), 28% ammonia solution (0.87%), triethanolamine (2.13%), propylene glycol (15%), and ultrapure water (72%). This ink was prepared in the same manner as described in Example B8 of Japanese Patent Laid-Open No. 5-230413.

Evaluation Test

The above prepared inks were evaluated in the following tests:

1) Continuous Printing

A sample of the ink composition was degassed and printed continuously for 24 hours under conditions of 25° C. and relative humidity 30% using an MJ-700V2C (tradename, manufactured by Seiko Epson Corporation). The weight of ejected ink per page was measured after the first 5 minutes and then after every six hours. The maximum sensitivity of the balance was 0.01 g. The following standards were used to evaluate the results of this test: the standard deviation of the five measurements is less than or equal to 0.5 (⊚); the standard deviation of the five measurements is greater than 0.5 and less than or equal to 1.0 (○); the standard deviation of the five measurements is greater than 1 and less than or equal to 1.5 (Δ); and the standard deviation of the five measurements is greater than 1.5 (X).

2) Discontinuous Printing

A sample of the ink composition was degassed and printed using a line pattern program which uses all of the nozzles of the print head. The printing program was implemented for 2 hours at 25° C. and a relative humidity of 30% using an MJ-700V2C (tradename, manufactured by Seiko Epson Corporation). The printing program was discontinuous; a repeating program of 1 minute of printing followed by 1 minute of rest was used. During the rest period, any cover for preventing the ink from drying was not put on the print head. The last printed sample of the 2 hour test was examined under a microscope and evaluated according to the following standards: no evidence of clogging and all of the expected dots at the last restart of the printing program were observed (⊚); evidence of minor clogging in that between 1 and 5 of the expected dots at the last restart of the printing program were missing (○), evidence of significant clogging in that between 6 and 21 of the expected dots at the last restart of the printing program were missing (Δ); evidence of unacceptable clogging in that more than 21 of the expected dots at the last restart of the printing program were missing (X).

3) Blotted Image Drying Speed

A sample of the ink composition was degassed and printed on Xerox P paper (tradename, manufactured by Fuji Xerox Co., Ltd.) using a program which prints a full density blotted rectangular block 1 cm by 7.2 cm. The samples was printed using an MJ-700V2C (tradename, manufactured by Seiko Epson Corporation). Immediately after printing of the block was completed, the time until the complete disappearance of the glossy, light-reflecting liquid ink was measured. The following standards were used to evaluate the drying speed: less than or equal to 1 second (⊚), less than or equal to 2 seconds, but greater than 1 second (○), less than or equal to 5 seconds, but greater than 2 seconds (Δ), greater than 5 seconds (X).

4) Redissolution/Redispersion of Dried Ink

One μl sample of the ink was spotted on a teflon block (15 mm×10 mm×1 mm) and set aside to dry at room temperature for 24 hours. The sample was further dried at 40° C. for an additional 72 hours. Next, the teflon block with the sample placed thereon was immersed in 20 ml of the original ink solution. It was removed after one hour using a pair of tweezers and then examined. If part of the dried ink sample remained on the teflon block, the sample was returned to the original ink solution. The sequence of 1) soaking, 2) removing and 3) examining was repeated at one hour intervals for 5 hours or until no evidence of the sample remained on the teflon block. The following standards were used to evaluate the ink: 1 hour or less (⊚), 2 hours or less, but greater than 1 hour (○), 4 hours or less, but greater than 2 hours (Δ), and greater than 4 hours (X).

5) Waterfastness of Printed Sample

A sample of ink composition was degassed and characters and graphics were printed on Xerox P and R papers (tradename, manufactured by Fuji Xerox Co., Ltd.) using an MJ-700V2C (tradename, manufactured by Seiko Epson Corporation). The printed samples were set aside to dry for 24 hours. Ten drops of water (each drop was 0.05 ml) were carefully placed on both printed characters and printed graphics. The wetted samples were allowed to dry for 24 hours. The following standards were used to evaluate the waterfastness of the printed images: the wetted print samples for both paper types are unchanged, with respect to unwetted characters, for both characters and graphic images (⊚), the wetted print samples for both paper types are unchanged for characters, but shows slight fading and/or halos for full density blotted graphic images (○), the wetted print samples for only one of the paper types is unchanged for characters and both paper types show slight fading and/or halos for full density blotted graphic images (Δ), the wetted print samples for both of the paper types show fading and/or halos for characters and graphic images (X).

The above described inks, examples of the present invention and comparative examples, were evaluated by the above described five test methods. The results are shown below in Tables 1 and 2.

TABLE 1

| Sample | Continuous Printing | Discontinuous Printing | Drying Speed | Redissolution/Redispersion | Waterfastness |
|---|---|---|---|---|---|
| Example A1 | ◎ | ○ | ○ | ○ | ◎ |
| Example A2 | ◎ | ◎ | ○ | ○ | ◎ |
| Example A3 | ◎ | ◎ | ○ | ○ | ◎ |
| Example A4 | ◎ | ◎ | ○ | ○ | ◎ |
| Example A5 | ◎ | ◎ | ○ | ○ | ◎ |
| Example A6 | ◎ | ◎ | ○ | ○ | ◎ |
| Example A7 | ◎ | ◎ | ○ | ○ | ◎ |
| Example A8 | ◎ | ○ | ◎ | ○ | ○ |
| Example A9 | ◎ | ○ | ◎ | ○ | ○ |
| Example A10 | ◎ | ○ | ◎ | ○ | ○ |
| Example A11 | ◎ | ◎ | ◎ | ◎ | ○ |
| Example A12 | ◎ | ◎ | ◎ | ◎ | ○ |
| Comparative Example A1 | ○ | X | Δ | X | ◎ |
| Comparative Example A2 | ◎ | ◎ | ◎ | ◎ | X |

TABLE 2

| Sample | Continuous Printing | Discontinuous Printing | Drying Speed | Redissolution/Redispersion | Waterfastness |
|---|---|---|---|---|---|
| Example B1 | ◎ | ◎ | ○ | ○ | ◎ |
| Example B2 | ◎ | ○ | ○ | ○ | ◎ |
| Example B3 | ◎ | ○ | ○ | ○ | ◎ |
| Example B4 | ◎ | ◎ | ○ | ○ | ◎ |
| Example B5 | ◎ | ◎ | ○ | ○ | ◎ |
| Example B6 | ◎ | ◎ | ○ | ○ | ◎ |
| Example B7 | ◎ | ○ | ○ | ○ | ◎ |
| Example B8 | ◎ | ◎ | ○ | ○ | ○ |
| Example B9 | ◎ | ○ | ○ | ○ | ○ |
| Example B10 | ◎ | ◎ | ○ | ○ | ○ |
| Example B11 | ◎ | ◎ | ○ | ○ | ○ |
| Comparative Example B1 | ○ | X | Δ | X | ◎ |
| Comparative Example B2 | ◎ | ◎ | ◎ | ◎ | X |

What is claimed is:

1. An ink composition comprising: water; an alkali-soluble polymer resin which contains sulfonic acid or phenolic functionalities; a dye, and an alkali in an amount sufficient to completely dissolve both the alkali-soluble polymer resin and the dye, the dye being a basic dye or an oil-soluble salt-type dye with the color imparting portion of the salt being cationic, said alkali-soluble polymer resin containing phenolic functionalities when the dye is a basic dye.

2. The ink composition as claimed in claim 1, wherein the dye is present in an amount of 0.05 to 3 parts by weight based on one part by weight of the alkali-soluble polymer resin.

3. The ink composition as claimed in claim 1 which further comprises a water-soluble monoalkyl ether of an alkylene glycol or a polyalkylene glycol.

4. The ink composition as claimed in claim 1 which has a viscosity of less than 10 cps at 20° C. and is used in ink-jet recording.

5. The ink composition as claimed in claim 1 wherein said alkali-soluble polymer resin contains sulfonic acid functionalities and has a solubility in water with a pH of 4 to 7 of less than 0.1 g/l at 25° C.

6. The ink composition as claimed in claim 1 wherein said alkali-soluble polymer resin contains phenolic functionalities and has a solubility in water with a pH of 4 to 7 of less than 0.1 g/l at 25° C.

7. The ink composition as claimed in claim 1 wherein said dye has a solubility in water of less than 0.1 g/l at 25° C.

8. The ink composition as claimed in claim 1 wherein the amount of the alkali-soluble polymer resin contained is 1 to 15% by weight based on the weight of the ink and the amount of the dye is 0.2 to 1.2 parts by weight based on the weight of the alkali-soluble polymer resin.

9. The ink composition as claimed in claim 1 which further comprises a water-soluble monoalkyl ether of an alkylene glycol or a polyalkylene glycol selected from diethylene glycol monomethyl ether, diethylene glycol monoethyl ether, diethylene glycol mono-n-butyl ether, triethylene glycol n-butyl ether, triethylene glycol monoethyl ether, triethylene glycol monoiso-propyl ether, triethylene glycol monomethyl ether, or a mixture thereof.

10. A method of preparing the ink composition as claimed in claim 1, comprising the steps of: blending the alkali-soluble polymer resin and the dye at a temperature above the softening point of the polymer resin and below the decomposition temperature of the dye; and then dissolving the resulting blended mixture of polymer resin and dye in water to which an amount of alkali, which will completely dissolve the alkali-soluble polymer resin and the dye, has been added.

11. A method of preparing the ink composition as claimed in claim 1, comprising the steps of: dissolving the alkali-soluble polymer resin in water in the presence of the alkali; and further dissolving the dye in the solution.

12. An ink-jet recording method comprising the steps of: ejecting droplets of the ink composition as claimed in claim 1; and depositing the droplets onto a recording medium.

13. A record prepared by the recording method as claimed in claim 12.

14. The ink composition as claimed in claim 1, wherein the dye is the basic dye and the alkali-soluble polymer resin contains phenolic functionalities.

15. The ink composition as claimed in claim 1, wherein the dye is the oil-soluble salt-type dye with the color imparting portion of the salt being cationic.

* * * * *